United States Patent Office 3,697,287
Patented Oct. 10, 1972

3,697,287
AMINO ACID FOOD COMPOSITION
Milton Winitz, Palo Alto, Calif., assignor to
Morton-Norwich Products, Inc., Chicago, Ill.
No Drawing. Continuation-in-part of applications Ser.
No. 510,778, Dec. 1, 1965, now abandoned, Ser. No.
550,204, May 16, 1966, and application Ser. No.
705,290, Feb. 14, 1968, now abandoned. This application Jan. 28, 1969, Ser. No. 794,790.
Int. Cl. A23l 1/00
U.S. Cl. 99—1
31 claims

ABSTRACT OF THE DISCLOSURE

A composition palatable to the human species which contains all of the essential amino acids, essential minerals and carbohydrate. A complete palatable diet is shown which contains in an aqueous emulsion the essential and non-essential amino acids, minerals, vitamins, carbohydrate and fat in balanced quantities to supply all of the nutritional needs for the human species and in a form to bypass normal digestive functions. The same diet in dry form is soluble as an aggregate in water.

---

This application is a continuation-in-part of my previous application, Ser. No. 510,778, filed Dec. 1, 1965, now abandoned and application, Ser. No. 550,204, filed May 16, 1966, and application Ser. No. 705,290, filed Feb. 14, 1968, now abandoned.

This invention relates to mixtures of amino acids for human consumption to supply all the essential amino acid requirements, and more particularly to palatable chemically defined diets for human consumption.

Complete diets require the presence of protein, vitamins, minerals, fats, and a source of calories generally in the form of carbohydrates. Natural foodstuffs, such as meat, fruit, grains and leafy vegetables, provide these constituents. It has long been the aim of nutritionists to develop complete synthetic diets that would incorporate these constituents, and such diets have been indeed developed.

Proteins are high molecular weight, highly complex polymers composed of a variety of the so-called essential and non-essential amino acids. Utilization of protein by the animal organism requires that the protein be degraded by the proteolytic enzymes of the gastrointestinal tract to the constituent individual amino acids because the amino acids can be absorbed through the gastro intestinal tract only in the free, uncombined form. The essential amino acids, of which there are considered to be ten in number (leucine, isoleucine, valine, methionine, tryptophan, phenylalanine, threonine, arginine, lysine and histidine), are a vital requirement of the animal species. For a dietary regimen to be considered adequate for the support of all normal physiological functions, it should contain these essential amino acids in the appropriate levels and in the proper proportion of one to the other. The function of the non-essential amino acids is to provide a source of metabolizable nitrogen required by the animal organism for the biosynthesis of proteins, purines, nucleic acids, and other metabolites. Examples of the non-essential amino acids include alanine, glycine, proline, glutamic acid, aspartic acid, and serine. Proper nutritional balance requires that these non-essential amino acids be provided in sufficient quantity and within a range of proportions to each other that is less restrictive or critical than the balance required for the essential amino acids.

Amino acids (except glycine) contain one or more asymmetric centers and thus may exist in two or more stereoisomeric forms. Nutritional experience has shown that only the L-isomer of an amino acid can be utilized by the animal organism and that the animal organism has only a very limited capacity for enzymatically converting some amino acids to the L form from the D form. In addition, an oversupply of D-amino acids can be deleterious and can lead to an inhibition of the normal physiological function. All proteins found in nature contain their constituent amino acids in the L configuration only.

Carbohydrates in a typical dietary regimen are provided in the form of starches, which are high molecular-weight and relatively water-insoluble polymers of glucose. Other sources of carbohydrate, such as lactose (a disaccharide of galactose and glucose) and sucrose (a disaccharide of fructose and glucose), as well as monosaccharides, such as fructose and glucose, occur in natural dietary regimens, but to a much more limited extent. The carbohydrates are employed by the animal organism as a prime source of energy. Prior to utilization by the animal organism, the polymeric or dimeric forms of the carbohydrates are degraded to the constituent monomers by enzymatic action in the gastrointestinal tract in order that they may be absorbed through the gastrointestinal tract.

Lipids typically appear in a natural dietary regime as fats and oils in the form of triglycerides of three molecules of fatty acids in combination with one molecule of glycerol. The common fatty acids in such triglycerides are those having between 12 and 24 carbon atoms, such as palmitic, stearic, myristic, oleic, linoleic, linolenic, and arachidonic acids. Of these, only linoleic, linolenic, and arachidonic acids have been found to be essential to normal physiological function of animal organisms. The essential fat requirement can be satisfied either by sufficient quantities of linoleic or arachidonic acids, or by combinations of the two, or by linolenic acid in combination with sufficient quantities of either or both of the other two. Degradation of fats prior to absorption through the gastrointestinal tract is accomplished by the enzymatic action of the lipases of the gastrointestinal tract, through which enzymatic action free fatty acids are formed. Other than the essential fats for which there is a vital requirement by the body, fats, like carbohydrates, serve as a source of energy.

Animal organisms have requirements for certain anions and cations of mineral salts, and mineral requirements for certain of the various anions and cations have been established. The ions required in greatest quantity include sodium, potassium, calcium, magnesium, and chloride ion, whereas other required ions (known as the trace elements), such as iron, manganese, cobalt, copper, molybdenum, zinc, and iodide ion, are required in lesser amounts. Minerals are provided in a natural dietary regimen primarily in the dissociated form (e.g., sodium chloride as the sodium and chloride ions), but they may also occur in the diet in covalent combination with organic molecules (e.g., cobalt in vitamin B-12 and iron in hemoglobin).

Minimum requirements have been established for certain of those vitamins, both water- and fat-soluble, that are known to be necessary for normal physiological function. Vitamins occur in natural dietary regimens either as the free form or combined with other chemical moieties. The water-soluble vitamins include ascorbic acid, thiamine, riboflavin, vitamin B-6, vitamin B-12, pantothenic acid, biotin, inositol, choline, p-aminobenzoic acid; the fat-soluble vitamins include vitamin A, vitamin D, menadione, and tocopherol.

As used in this patent application, the term "defined diet" refers to a diet formulation consisting essentially of highly purified nutrients. If the nutrients of the defined diet are all present in the form of compounds whose precise molecular configuration is known, this defined diet is termed a "chemically defined diet." Nutrients whose precise molecular configuration may not be known and whose inclusion would remove the diet from the chemically-defined-diet category, include, for example, proteins, peptones, starches, dextrins and fats. On the other hand, nutrients whose molecular configurations are precisely known and may be a part of chemically defined diets include, for example, amino acids and their simple precursors, such as purified peptides, mono- and disaccharides and esters of pure fatty acids.

Various attempts have been made to formulate synthetic diets for human consumption to supply all of the requirements of the essential amino acids and nitrogen needed for growth and sustenance or normal physiological activity. In the formulation of such synthetic diets, the principle which has been employed was to substitute for proteins in the natural foodstuffs with their constituent amino acids. However, attempts to formulate amino acid mixtures that would be nutritionally adequate and at the same time palatable for human consumption have heretofore been unsuccessful. Although nutritionally adequate amino acid mixtures containing in addition carbohydrates, fats, minerals, and vitamins have been formulated and have been successfully employed in metabolic and nutritional studies with experimental animals and with humans, long term provisions of defined diets to humans has been thwarted by virtue of the unpalatable nature of the diets. Amino acid mixtures in such defined diets have been provided, in essence, in two forms, either as mixtures of individual crystalline amino acids or as mixtures of amino acids obtained through the hydrolysis of proteins. Although such mixtures can be taken by humans, the taste of such mixtures has heretofore been such as to make them objectionable to those who are consuming them.

Adequate chemically defined diets have also been formulated, and one such diet is described in Nature, volume 205, No. 4973, pp. 741–743 (Feb. 20, 1965). This diet has also been unpalatable to humans, and its usefulness has generally been limited to experimental projects where the desire of the subjects, as in the furtherance of research, overcame the problem of unpalatability.

From a commercial and a research viewpoint, it becomes desirable to develop palatable amino acid mixtures which will not impart an off-taste and off-odor into nutrient mixtures containing other essentials.

It is an object of the invention to provide a palatable food composition for human consumption containing all of the essential amino acids. It is another object to provide palatable mixtures of amino acids and other nutrients which will satisfy the essential amino acid requirements in diet formulations for human consumption. A further object is to provide such amino acid-containing diet formulations which have good storage stability in aqueous solution and in the solid state. These and other objects of the invention will be apparent from the following detailed description of various embodiments having certain features of the invention.

It is believed that the objectionable taste of previous chemically defined diet formulations has three basic or major causes: namely, (a) the inclusion in the formulation of amino acids or substantially simple amino acid derivatives containing sulfhydryl (SH) groups (e.g., cysteine, homocysteine) or other groups which are convertible to sulfhydryl groups (e.g., cystine, homocystine); (b) the inclusion in the formulation of amino acids or substantially simple amino acid derivatives whose taste is incompatible with the flavor of the mixture of the other ingredients (e.g., glutamic acid or its alkali metal salts, such as sodium glutamate); and (c) the use of amino acids or substantially simple amino acid derivatives that are not of sufficient purity. Derivatives are considered to be products which evolve by decomposition of the amino acids or by chemical conversion of amino acids to other discrete chemical entities.

The off-taste caused by the sulfhydryl group of amino acids or simple amino acid precursors is avoided when the concentration of such amino acids which contain the sulfhydryl group, or which contain groups that are convertible to the sulfhydryl group, is limited in the food composition. Generally, the amino acids will be consumed as a water solution together with a carbohydrate, such as glucose, and various essential minerals, and it has been found that the amount of sulfhydryl group which can be tolerated is not an absolute figure but is dependent upon the pH of the solution. A food product of this general type having a fairly high carbohydrate content would normally have a pH within the range of about 3 to about 7.5, and for flavor purposes, the pH of the food composition is preferably maintained between about 3.4 and about 5.7. To assure palatability in such a solution having a pH of about 5.7 or greater, sulfhydryl groups should not be present in an amount greater than about 0.05 gram per liter, based upon the weight of the sulfhydryl groups alone. However, it has been found that the palatability of such a solution at a lower pH is even more sensitive to the amount of sulfhydryl groups present and that when the pH of the solution is about 3.7, the tolerable concentration of sulfhydryl groups is reduced to a value of 0.038 gram per liter. In the middle of the pH range, the change in the tolerance level of sulfhydryl groups is generally directly proportional to the change in pH, with the tolerance for sulfhydryl groups decreasing about 0.003 gm./liter for each decrease of about 0.5 in pH.

The amino acids for the composition can be provided either as the free amino acids or as suitable simple precursors thereof (for example, purified peptones and peptides) which will be converted to free amino acids by the metabolic processes of the human body, or as mixtures of the aforementioned groups. Moreover, as used in this application, the term "amino acid" or "free amino acid" or the named amino acid should be understood to also include the simple reaction product of the amino acid and another chemical compound (for example, esters, amides and salts of amino acids) in which form the amino acids may also be employed without detracting from their nutritional utilization.

Palatable amino acid mixtures for human consumption can be formulated and used in a complete diet with carbohydrates, fats, vitamins and minerals, which mixtures may be either substantially pure amino acids or may be amino acids in the form of protein hydrolysates, such as might be obtained from the hydrolysis of casein. As indicated above, one of the keys to obtaining a palatable formulation lies in limiting the amount of the sulfhydryl (SH) groups and/or the disulfide linkages in the amino acid components in the formulation. If the critical limits are exceeded, the resulting product has a high degree of objectionable sulfurous taste and is for all practical purposes unpalatable and unacceptable for human consumption. It is to be noted that taste is inherently susceptible of subjective definition, and for purposes of the present application, a product is considered unpalatable if it is rejected by at least about 75 percent of the persons who taste it. Moreover, if a composition should exceed the aforementioned critical level upon initial formulation, the taste worsens upon storage for any appreciable length of time, becoming completely obnoxious to taste and smell.

Of the amino acids derived from proteins with which the present application is concerned, those containing sulfur are cysteine, cystine and methionine. Methionine is the only essential amino acid of the three and can give rise to the creation of methyl mercaptan, which is treated separately hereinafter. Although cystine and cysteine are so called nonessential amino acids, either can be substituted for part of the required amount of methionine. In the case of nutrient compositions that are formulated from substantially pure amino acids, the amount of SH groups and disulfide linkages (which form SH groups upon reduction in solution by other components, such as ascorbic acid) in the diet are regulated by limiting the amount of these groups added to the formulation in the form of cystine, which contains a disulfide linkage, cysteine, which contains an SH group, or simple precursors of either cystine or cysteine.

Virtually all proteins contain cystine and cysteine so that in any preparation of protein hydrolysates from such proteins each of these components is present. If protein hydrolysates are to be employed as the source of amino acids, the amount of components bearing the SH groups and/or disulfide linkages are selectively reduced or removed from the hydrolysate mixture, using suitable techniques (for example, ion exchange chromatography, fractional crystallization or precipitation as heavy metal salts). When selective removal of the components bearing these sulfhydryl groups and disulfide linkages from protein hydrolysates brings the level of nutritionally essential sulfur-containing nutrients below the desirable, nutritionally adequate level, the desired sulfur level is provided in the nutrient formulation either by adding purified cystine, cysteine, or a combination of both, to a level below the aforementioned critical level and/or by substituting substantially purified methionine.

Certain other amino acids or their simple reaction products (e.g., glutamic acid, sodium glutamate) themselves possess strong characteristic flavors that are incompatible with the taste of other ingredients of chemically defined diet formulations for human consumption. It has been found that when glutamic acid (as the free acid or as an equivalent amount of the sodium salt) is incorporated in the amino acid formulation in amounts greater than about 1.43 grams of glutamic acid per liter of aqueous solution (equivalent to about 1.64 grams of sodium glutamate per liter), the diet formulation carries an objectionable taste which renders it unpalatable for human consumption. Where a nutritionally balanced diet requires either glutamic acid or its nutritional equivalent, the off-taste problem can be obviated by providing an equimolar amount of the nutritional equivalent, glutamine, in lieu of all of the glutamic acid or in lieu of substantial portion thereof. If, for example, a particular protein hydrolysate would contain glutamic acid and/or sodium glutamate in an amount so that the desired end solution would exceed about 1.43 grams of glutamic acid per liter, an objectionable taste is avoided by removing at least a portion of the glutamic acid and substituting a sufficient amount of glutamine so that the glutamic acid (and/or sodium glutamate) concentration will be less than about 1.43 grams of glutamic acid per liter. It appears that the tolerance for glutamic acid is independent of pH in the pH range of interest.

Another potential cause of off-taste in chemically defined diet compositions is the presence of impurities in the individual amino acids (or simple precursors). One of the principal impurities that can cause off-taste is a lower alkyl mercaptan, such as methyl mercaptan, which is a contaminant of most commercial edible grades of methionine. Removal of the simple mercaptan impurities can be achieved by purifying the methionine just prior to its inclusion in a dietary mixture. Purification can be effected by recrystallization from water, or a water-ethanol mixture, or other suitable solvents or mixtures of solvents. The objectionable off-taste imparted by simple mercaptan impurities is avoided by limiting the concentrations of simple mercaptans in a diet composition for human consumption.

It has been found the tolerable concentration of mercaptan is pH dependent, as was the case with the tolerance for sulfhydryl groups as hereinbefore described. However, the mercaptan level is generally inversely proportional to the pH. At a pH of about 3.7 or less, a food product having more than about milligrams per liter of methyl mercaptan is unpalatable. For food products having higher pH values, the tolerable concentration decreases in amount generally equal to 1.5 mg./liter for each increase in pH of about 0.4, so that for a food product having a pH of about 5.7 (the approximate upper end of the preferred range) the methyl mercaptan concentration should not exceed about 7.5 milligrams per liter to assure palatability. Moreover, as previously pointed out with respect to sulfhydryl level, if a composition should exceed this mercaptan level upon initial formulation, the taste worsens upon storage for any appreciable length of time, becoming completely obnoxious to taste and smell.

Certain limits have been set forth above for the limits of concentrations of various chemical moieties to provide for palatable food compositions for human consumption. These limits pertain to the total concentrations of these moieties in the food composition, without regard to the source of such moieties, whether from a given component, any other component, or from their generation as derivatives during compounding or storage.

As previously indicated, the amino acid components of a diet are selected to meet the normal metabolic needs of the subject and to maintain the desired nitrogen balance. In chemically defined diets, the amino acid components, in the form of free essential and non-essential amino acids or suitable precursors thereof, such as peptides, are provided at total levels sufficient to satisfy normal physiological requirements for nitrogen. Accordingly, the balance among the various amino acids is selected to meet the normal metabolic needs of the human subject and to maintain the desired nitrogen balance. Because of strong interdependencies between the required level of a given amino acid and the level of one or more of the other amino acids present in diet, it is not practicable to establish a precise range of levels for each of the amino acids. Generally, the ratios of the levels of amino acids in the diets should approximate those of a high quality protein, such as meat, eggs, or milk, for example.

The amino acid content of such materials is set forth in "Amino Acids Content of Foods," M. L. Orr and B. K. Watt, Home Economics Research Report No. 4, Agricultural Research Service, U.S. Dept. of Agriculture, December 1957, available from the Superintendent of Documents, U.S. Government Printing Office. A useful guide in determining minimum protein and amino acid requirements for formulating diets other than those specifically disclosed herein is found in "Protein Requirements," Report of the FAO Committee, Rome, Italy, October 24–31, Food and Agricultural Organization of the United Nations (1957), available from Columbia University Press.

However, after due experimentation, preferred levels of the essential amino acids have been established which are considered to be excellently adapted for supplying the metabolic needs of the human species. A composition employing the essential amino acids in these levels with respect to one another is given in Table IV hereinafter. It is considered that deviation in the amount of any particular one of the essential amino acids, with respect to others, should not be more than about plus or minus 5 percent by weight.

Tables I, II, III and IV illustrate palatable diet formulations considered to provide all the necessary nutritional values for human consumption. The diets set forth in Table I and II are designed to be taken in two parts, with the fats and fat-soluble vitamins being separated from the remainder. The diets set forth in Tables III and IV are administered as single entities in the form of an emulsion. The diets set forth in Tables III and IV are entitled Diet Base because, if they were to be administered for any significant length of time, e.g., more than about two weeks, a source of the cobalt and molybdenum ions would be added and folic acid and menadione (Vitamin K) would be provided at about the levels in Diet Formulation II.

TABLE I.—Diet Formulation I

Amino acids

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine·HCl·H$_2$O | 1.58 |
| L-methionine | 2.48 |
| L-alanine | 2.58 |
| L-aspartic acid | 5.50 |
| L-threonine | 2.42 |
| L-proline | 3.42 |
| Glycine | 4.20 |
| L-serine | 1.78 |
| L-tyrosine ethyl ester·HCl | 4.10 |
| L-tryptophan | 0.75 |
| L-glutamine | 9.15 |

Vitamins

| | | |
|---|---|---|
| Thiamine·HCl | mg | 1.00 |
| Riboflavine | mg | 1.50 |
| Pyridoxin·HCl | mg | 1.67 |
| Niacinamide | mg | 10.00 |
| Inositol | mg | 0.83 |
| d-Ca pantothenate | mg | 8.33 |
| d-Biotin | mg | 0.83 |
| Folic acid | mg | 1.67 |
| Ascorbic acid | mg | 62.50 |
| Cyanocobalamin | μg | 1.67 |
| p-Aminobenzoic acid | mg | 416.56 |
| Choline bitartrate | mg | 231.25 |

Minerals

| | | |
|---|---|---|
| Potassium iodide | mg | 0.25 |
| Manganous acetate·4H$_2$O | mg | 18.30 |
| Zinc chloride | mg | 1.25 |
| Cupric acetate·H$_2$O | mg | 2.60 |
| Cobaltous acetate·4H$_2$O | mg | 1.67 |
| Sodium glycerophosphate·5½ H$_2$O | g | 5.23 |
| Potassium sorbate | g | 1.00 |
| Ammonium molybdate·4H$_2$O | mg | 0.42 |
| Potassium hydroxide | g | 4.00 |
| Magnesium oxide | g | 0.38 |
| Sodium hydroxide | g | 1.68 |
| Ferrous ammonium sulfate·6H$_2$O | g | 0.68 |
| Calcium chloride·2H$_2$O | g | 2.44 |
| Sodium chloride | g | 5.35 |

Carbohydrates

| | G. |
|---|---|
| Glucose | 570 |
| Glucono-δ-lactone | 17.20 |

Fats and fat-soluble vitamins

| | | |
|---|---|---|
| Ethyl linoleate | g | 2.000 |
| Vitamin A acetate | mg | 3.640 |
| Vitamin D | mg | 0.057 |
| α-Tocopherol acetate | mg | 57.29 |
| Menadione | mg | 4.58 |

Flavoring

Synthetic flavoring agents and distilled water are added in amounts compatible with optimal palatability, including 15 to 20 g. of citric acid, preferably 17.85 g.

TABLE II. DIET FORMULATION II

Amino acids

| | G. |
|---|---|
| L-alanine | 2.64 |
| L-arginine·HCl | 5.34 |
| L-aspartic acid | 5.63 |
| L-glutamine | 9.29 |
| Glycine | 4.30 |
| L-histidine·HCl·H$_2$O | 1.62 |
| L-isoleucine | 2.47 |
| L-leucine | 3.92 |
| L-lysine·HCl | 3.67 |
| L-methionine | 2.54 |
| L-phenylalanine | 2.82 |
| L-proline | 3.52 |
| L-serine | 1.82 |
| L-threonine | 2.47 |
| L-tryptophan | 0.77 |
| L-tyrosine ethyl ester·HCl | 4.20 |
| L-valine | 2.73 |

Minerals

| | | |
|---|---|---|
| Acetic acid | mg | 8.93 |
| Ammonium molybdate·4H$_2$O | mg | 0.43 |
| Calcium chloride·2H$_2$O | g | 2.500 |
| Cobaltous acetate·4H$_2$O | mg | 1.70 |
| Cupric acetate·H$_2$O | mg | 2.55 |
| Ferrous ammonium sulfate·6H$_2$O | g | 0.698 |
| Magnesium oxide | g | 0.385 |
| Manganous acetate·4H$_2$O | mg | 18.73 |
| Potassium hydroxide | g | 4.062 |
| Potassium iodide | mg | 0.255 |
| Potassium sorbate | g | 1.024 |
| Sodium chloride | g | 5.478 |
| Sodium glycerophosphate·5½H$_2$O | g | 5.359 |
| Sodium hydroxide | g | 1.707 |
| Zinc chloride | mg | 1.28 |

Water-soluble vitamins

| | | |
|---|---|---|
| p-Aminobenzoic acid | mg | 639.0 |
| Ascorbic acid | mg | 96.0 |
| d-Biotin | mg | 1.28 |
| d-Calcium pantothenate | mg | 12.80 |
| Choline bitartrate | mg | 354.8 |
| Folic acid | mg | 2.56 |
| Inositol | mg | 1.28 |
| Niacinamide | mg | 15.36 |
| Pyridoxine·HCl | mg | 2.56 |
| Riboflavin | mg | 2.31 |
| Cyanocabalamin | mcg | 2.56 |

Carbohydrates

| | G. |
|---|---|
| Glucono-δ-lactone | 17.67 |
| Glucose | 592.0 |

Fats and fat-soluble vitamins

| | | |
|---|---|---|
| Ethyl linoleate | g | 2.0 |
| Vitamin A acetate | mg | 3.64 |
| Vitamin D | mg | 0.057 |
| α-Tocopherol acetate | mg | 57.29 |
| Menadione | mg | 4.58 |

Flavoring

Synthetic flavoring agents and distilled water are added in amounts compatible with optimal palatability, including 15 to 20 g. of citric acid.

TABLE III.—DIET FORMULATION III (BASE)

Amino acids

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine HCl·H$_2$O | 1.58 |
| L-alanine | 2.58 |
| L-aspartic acid | 5.50 |
| L-threonine | 2.42 |
| L-proline | 3.42 |
| Glycine | 4.20 |
| L-serine | 1.77 |
| L-tyrosine ethyl ester·HCl | 4.10 |
| L-glutamine | 9.07 |
| L-methionine | 1.75 |
| L-tryptophan | 0.75 |

Vitamins

| | | |
|---|---|---|
| Thiamine·HCl | mg | 1.20 |
| Riboflavin | mg | 1.70 |
| Pyridoxin·HCl | mg | 1.67 |
| Niacinamide | mg | 10.00 |
| Inositol | mg | 0.83 |
| d-Ca panthothenate | mg | 14.00 |
| Vitamin A acetate (U.S.P) | units | 5,000.00 |
| Vitamin D$_2$–D$_3$ | do | 400.00 |
| d-Biotin | mg | 0.30 |
| Folic acid | mg | 0.10 |
| Ascorbic acid | mg | 80.00 |
| Cyanocobalamin | mcg | 15.00 |
| p-Aminobenzoic acid | mg | 416.56 |
| Choline bitrartrate | mg | 231.25 |
| α-Tocopherol acetate | mg | 30.00 |
| Menadione | mcg | 60.00 |

Minerals

| | | |
|---|---|---|
| Potassium iodide | mg | 0.15 |
| Manganous acetate·4H$_2$O | mg | 18.33 |
| Cupric acetate·H$_2$O | mg | 2.50 |
| Sodium glycerophosphate·5½H$_2$O | g | 5.23 |
| Sodium chloride | g | 5.35 |
| Zinc chloride | mg | 1.20 |
| Potassium hydroxide | g | 3.97 |
| Magnesium oxide | g | 0.37 |
| Sodium hydroxide | g | 1.67 |
| Calcium chloride·2H$_2$O | g | 2.44 |
| Ferrous ammonium sulfate·6H$_2$O | mg | 0.682 |

Carbohydrates

| | G. |
|---|---|
| Glucose | 555.0 |
| Glucono-δ-lactone | 17.20 |

Fats

| | | |
|---|---|---|
| Ethyl linoleate | g | 2.00 |

Emulsifier

| | | |
|---|---|---|
| Polyoxyethylene sorbitan monooleate | g | 2.00 |

Flavoring

Synthetic flavoring agents and distilled water are added in amounts compatible with optimal palatability, including 15 to 20 g. of citric acid.

TABLE IV.—DIET FORMULATION IV (BASE)

Amino acids

| | G. |
|---|---|
| L-alanine | 1.76 |
| L-arginine·HCl | 3.89 |
| L-aspartic acid | 3.75 |
| L-glutamine | 6.19 |
| Glycine | 2.87 |
| L-histidine·HCl·H$_2$O | 1.08 |
| L-isoleucine | 1.65 |
| L-leucine | 2.61 |
| L-lysine·HCl | 2.45 |
| L-methionine | 1.69 |
| L-phenylalanine | 1.88 |
| L-proline | 2.35 |
| L-serine | 1.21 |
| L-threonine | 1.65 |
| L-tryptophan | 0.51 |
| L-tyrosine ethyl ester·HCl | 2.80 |
| L-valine | 1.82 |

Minerals

| | | |
|---|---|---|
| Acetic acid | mg | 5.95 |
| Calcium chloride·2H$_2$O | g | 2.93 |
| Cupric acetate·H$_2$O | mg | 6.12 |
| Ferrous ammonium sulfate·6H$_2$O | g | 0.126 |
| Magnesium oxide | g | 0.258 |
| Manganous acetate·4H$_2$O | mg | 12.49 |
| Potassium chloride | g | 2.33 |
| Potassium hydroxide | g | 1.27 |
| Potassium iodide | mg | 0.19 |
| Sodium chloride | g | 1.21 |
| Sodium glycerophosphate·5½H$_2$O | g | 8.13 |
| Sodium hydroxide | g | 1.13 |
| Zinc chloride | mg | 0.85 |
| Sorbic acid | g | 0.90 |

Water-soluble vitamins [1]

| | | |
|---|---|---|
| p-Aminobenzoic acid (K salt) | mg | 354.9 |
| Ascorbic acid | mg | 70.0 |
| d-Biotin | mg | 0.20 |
| d-Calcium pantothenate | mg | 10.0 |
| Choline chloride | mg | 85.0 |
| Folic acid | mg | 0.10 |
| Inositol | mg | 116.5 |
| Niacinamide | mg | 13.3 |
| Pyridoxine·HCl | mg | 2.0 |
| Riboflavin phosphate (Na salt) | mg | 1.64 |
| Thiamine·HCl | mg | 1.2 |
| Cyanocobalamin | mcg | 5.0 |

Carbohydrates

| | G. |
|---|---|
| Glucono-delta-lactone | 6.31 |
| Glucose | 400.5 |

Fats and fat-soluble vitamins

| | | |
|---|---|---|
| Safflower oil [2] | g | 1.33 |
| Vitamin A acetate | mg | 1.72 |
| Vitamin D$_2$ | mcg | 10.0 |
| α-Tocopherol acetate | mg | 20.0 |
| Polysorbate 80 (emulsifier) | mg | 66.7 |

Flavoring

Synthetic flavoring agents plus water are added, plus 12.12 g. of citric acid.

[1] Vitamin levels given represent amounts to be present in finished product.
[2] Or equal amount of ethyl linoleate.

The caloric values of such diets vary with the concentration of the dietary regimen, but typical liquid diets have sufficient added water to produce a caloric level of about 0.5 to 2.5 calories per milliliter. It is considered that calorie levels below about 0.5 calorie per milliliter for aqueous solutions are not practicable because it would be necessary for a person to take in too large an amount of water to obtain the daily nutritional requirements.

In one series of experiments, twenty-five normal adult subjects were confined for a period of twelve weeks to the diet of Table I as the sole source of sustenance. Ingestion of anything else other than distilled water was prohibited. The aqueous portion of the diet was provided ad libitum to each experimental subject who ingested amounts of the water-soluble components sufficient to meet his subjective needs. Caloric intake varied from subject to subject, but averaged 2100 calories per day per subject for the group as a whole. The fat compound was given to each subject as a separately daily supplement. The diets were considered to be palatable to the subjects. Each subject followed a daily activity schedule that included regulated moderate physical exercise. The subjects exhibited no unusual symptoms and showed a marked reduction in their blood serum cholesterol level, as explained in detail in my copending patent application Ser. No. 510,778. This reduction is considered to be due to the use of glucose, maltose, starches and/or dextrins as the sole source of carbohydrate. As an example, a liter of solution of a dietary composition might include purified safflower oil or ethyl linoleate in an amount of 0.74 gram, plus or minus about 5 percent, which may be formed into an emulsion with the aqueous phase using about 37 mg. of polyoxyethylene sorbitan monooleate.

Table II shows a diet formulation that is considered comparable to that shown in Table I and is included to illustrate changes in the levels of various ingredients which are considered tolerable for an adequate nutritional diet.

Tables III and IV illustrate other representative diets wherein the fat component and the aqueous component are combined by means of an emulsifier to eliminate the necessity of providing daily supplements of the fat component. These diets are not only equally palatable to those shown in Tables I and II, but are considered preferred for many applications because they include the entire diet complement as a single entity (less the items previously indicated which can be easily added if desired).

The relative amounts of the various components of the diet can be varied within fairly wide limits. The carbohydrate, vitamin, and mineral components, of course, are selected so as to supply, respectively, adequate caloric value and to adequately meet the necessary daily minimum requirements for these components. A representative diet composition might include vitamins in the following amounts per liter, plus or minus about 5 percent: potassium salt of P-aminobenzoic acid 197 mg., ascorbic acid 38.9 mg., d-biotin 0.11 mg., d-calcium pantothenate 5.5 mg., choline chloride 46.8 mg., folic acid 0.06 mg., inositol 64.8 mg., niacinamide 7.4 mg., pyridoxine·HCl 1.1 mg., sodium salt of riboflavin phosphate 0.91 mg., thiamine·HCl 0.7 mg., cyanocobalamin 2.8 mcg., Vitamin A acetate 0.96 mg., Vitamin D 5.5 mcg., alpha-tocopherol acetate 11.1 mg., and menadione 0.07 mg.

The fat component may be a fat, i.e., a glycerol ester of a fatty acid having between 12 and 24 carbon atoms, or a fat substitute, such as a simple alkyl ester of a fatty acid having between 12 and 24 carbon atoms, the alkyl group having 6 or less carbon atoms, for example, ethyl linoleate. The fat component is maintained at levels sufficient to meet the needs of normal physiological function. A purified naturally occurring fat such as purified safflower oil or corn oil can be used. It has been observed that a level of fat as low as 0.2 percent by weight (solids basis) of an otherwise adequate defined diet is sufficient to maintain normal health over an extended period of time. Although greater amounts of fat can be used, the fat component is preferably maintained at or slightly above this level. Preferably, the fat component constitutes less than about 1 weight percent of the dietary composition.

Suitable salts of the minerals are used to provide the essential minerals. A salt of magnesium is employed in which the cation in aqueous solution is the magnesium ion and the anion portion in aqueous solution is organic and/or inorganic and is metabolizable in and nontoxic to humans, for example, magnesium acetate, magnesium citrate, magnesium gluconate, and magnesium chloride. Nonmetabolizable or toxic salts, such as magnesium oxalate, should not be employed. A salt of potassium is supplied in which the cation in aqueous solution is the potassium ion and the anion portion in aqueous solution is organic and/or inorganic and is metabolizable in and nontoxic to humans, e.g., potassium bicarbonate and potassium sorbate. A ferrous salt is used in which the cation in aqueous solution is the ferrous ion and the ion portion in aqueous solution is organic and/or inorganic and is metabolizable in and nontoxic to humans, e.g., ferrous chloride, ferrous gluconate, ferrous ammonium sulfate, ferrous acetate and ferrous citrate. A phosphate salt is included in which the anion in aqueous solution is an organically bound phosphate ion and is metabolizable in and nontoxic to humans and in which the cation portion is inorganic, e.g., sodium glycerophosphate and sodium fructose 1:6-diphosphate. A calcium salt is supplied in which the cation in aqueous solution is the calcium ion and the anion portion is organic and/or inorganic and is metabolizable in and nontoxic to humans, e.g., calcium chloride, calcium acetate, calcium citrate and calcium bicarbonate. A salt of iodine is provided in which the anion is the iodide ion and the cation is metabolizable in and nontoxic to humans, e.g., sodium iodide, potassium iodide, magnesium iodide, and manganous iodide. A manganese salt is used in which the cation in aqueous solution is the manganous ion and the anion is an organic and/or inorganic ion which is metabolizable in and nontoxic to humans, for example, manganous chloride and manganous acetate. A zinc salt is supplied in which the cation in aqueous solution is the zinc ion and the anion is an organic and/or inorganic ion which is metabolizable in and nontoxic to humans, e.g., zinc chloride and zinc acetate. A copper salt is used in which the cation in aqueous solution is the cupric ion and the anion is an organic and/or inorganic ion which is metabolizable in and nontoxic to humans, e.g., cupric acetate·$4H_2O$. A sodium salt is used in which the ion in aqueous solution is the sodium ion and the anion portion is organic and/or inorganic and is metabolizable in and nontoxic to humans, e.g., sodium chloride.

In addition to the foregoing, it is preferred to include a cobalt salt in which the cation in aqueous solution is the cabaltous ion and the anion is an organic and/or inorganic ion which is metabolizable in and nontoxic to humans, and to also include a molybdenum salt in which the anion in aqueous solution is molybdate and in which the cation is sodium, potassium, ammonium or some other inorganic cation which is metabolizable in and nontoxic to humans. Example of the salts include cabaltous acetate·$4H_2O$, and sodium molybdate and potassium molybdate.

Of the foregoing minerals, it is considered important that any food composition which is designed to be the primary source of nutritional supply should contain sodium, magnesium, potassium, iron, calcium, chloride and phosphorous in nutritionally significant amounts, which may be defined as amounts which have substantial effect on the physiological functions of the human body. Because the amount of specific minerals to be included within a given composition in order to provide the established daily minimum requirements thereof is necessarily dependent upon the amount of the composition a human will be intended to consume each day, it is difficult to set minimum limits. However, it is considered that a practical maximum is about three and one-half liters per day of aqueous solution, with an amount not greater than about two liters being preferred. Based upon these considerations, it is considered that a palatable food composition should contain at least about the following specified amounts per liter of solution: sodium, 57 mg.; magnesium, 28.5 mg.; potassium, 285 mg.; iron, 2.85 mg.; calcium, 140 mg.; chloride, 200 mg.; and phosphorus, 140 mg. Diet formulations I and IV set forth various examples of combinations of minerals which might be suitably employed; and a representative diet composition might be formulated to include the following items in the specified amounts per liter of solution: hydrated calcium chloride 1.63 g., hydrated cupric acetate 3.45 mg., hydrated ferrous ammonium sulfate 3.9 mg., magnesium oxide 143 mg., hydrated manganous acetate, 6.94 mg., potassium chloride 1.29 g., potassium hydroxide 0.71 g., potassium iodide 0.1 mg., sodium chloride 0.67 g., hydrated sodium glycerophosphate 4.50 g., sodium hydroxide 0.63 g., zinc chloride 0.47 mg., acetic acid 3.31 mg., glucono-delta-lactone 3.50 g.

To provide human subjects with a choice of tastes for a daily complete diet such as this invention can provide, differently flavored versions of the chemical diet have been developed. It was found that certain flavors, particularly the citrus and other fruit flavors, are most compatible with the sweetness imparted to the diet by the high glucose content and with the other aspects of the diet. Two completely satisfactory flavors, orange and peach, have successfully undergone rigorous taste-panel testing for acceptability. In Diet Formulations I through IV, an amount of citric acid is included under the heading Flavoring and complements the synthetic flavoring employed to provide a true fruit taste. Other organic acids, such as tartaric acid, malic acid and fumaric acid, may also be used.

The following examples are directed to partial and complete diet formulations which have been chosen to illustrate various aspects of the invention. It should be understood that these examples are provided for purposes of illustration and do not constitute limitations upon the scope of the invention which is defined solely by the claims at the end of this specification.

EXAMPLE I

A composition containing the following essential and non-essential amino acids plus the vitamins, minerals, carbohydrates, and flavoring and coloring agents shown in Table I is formulated. The amounts of the amino acids are altered slightly to the amounts listed below:

| | G. |
|---|---|
| L-lysine·HCl | 3.58 |
| L-leucine | 3.83 |
| L-isoleucine | 2.42 |
| L-valine | 2.67 |
| L-phenylalanine | 1.75 |
| L-arginine·HCl | 2.58 |
| L-histidine·HCl·H$_2$O | 1.58 |
| L-methionine | 1.75 |
| L-alanine | 2.58 |
| Sodium L-aspartate | 6.40 |
| L-threonine | 2.42 |
| L-proline | 10.33 |
| Glycine | 1.67 |
| L-serine | 5.33 |
| L-tyrosine ethyl ester·HCl | 6.83 |
| L-tryptophan | 0.75 |
| L-glutamine | 9.07 |

Each of the amino acids listed above is first recrystallized from water or water-ethanol or other suitable solvent mixture in the presence of activated charcoal. The purified amino acids in the amounts indicated above are then dissolved successively in 500 milliliters of distilled or deionized water at a temperature of 90° C. The composition of the remainder of the formulation is identical with that shown in Table I. The glucose component is added to the amino acid solution at this temperature and dissolved. The mineral components are added either as the individual dry salts or as the aqueous pre-solutions described below. Pre-solution A consists of the potassium hydroxide, magnesium oxide, and glucono-delta-lactone components dissolved in water. Pre-solution B consists of the trace-mineral salts dissolved in water. After cooling the batch to 30° C., the water-soluble vitamins are then added either individually or as a pre-mix. A peach flavoring agent is then added, plus the citric acid indicated, which brings the pH of the solution to about 3.7.

The chemical diet prepared in this manner has been shown in taste-panel tests to be palatable and highly acceptable for human consumption.

EXAMPLE II

A composition of the following essential and non-essential amino acids is made by dissolving them in the specified quantities in 500 milliliters of distilled water:

| | G. |
|---|---|
| L-lysine·HCl | 3.58 |
| L-leucine | 3.83 |
| L-isoleucine | 2.42 |
| L-valine | 2.67 |
| L-phenylalanine | 1.75 |
| L-arginine·HCl | 2.58 |
| L-histidine·HCl·H$_2$O | 1.58 |
| L-methionine | 1.75 |
| L-alanine | 2.58 |
| Sodium L-aspartate | 6.40 |
| L-threonine | 2.42 |
| L-proline | 10.33 |
| Glycine | 1.67 |
| L-serine | 5.33 |
| L-tyrosine ethyl ester·HCl | 6.83 |
| L-tryptophan | 0.75 |
| L-glutamine | 9.07 |
| L-cysteine ethyl ester·HCl | 0.92 |

The preparation procedures for purification of the amino acids and the sequence and conditions for adding the amino acids, carbohydrate, minerals, vitamins, and flavoring for this example are identical with those specified in Example I. The composition of Example II only differs from that of Example I in that 0.92 gram of L-cysteine ethyl ester hydrochloride is included in Example II. The total dilution of each of these compositions is such that the final aqueous solution measures about 2.5 liters. This amount of cysteine ethyl ester hydrochloride is equivalent to about 0.37 gram per liter.

It was found in both the feeding study described in Nature, vol. 205, No. 4973, pp. 741–743 (Feb. 20, 1965) and in subsequent taste-panel tests that the chemical diet prepared in the manner of Example II is unpalatable to the human taste.

EXAMPLE III

A composition of the following recrystallized essential and non-essential amino acids is made by dissolving them at 90° C. in the specified quantities in 1 liter of distilled water:

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine·HCl·H₂O | 1.58 |
| L-methionine | 1.75 |
| L-alanine | 2.58 |
| L-aspartic acid | 5.50 |
| L-threonine | 2.42 |
| L-proline | 3.42 |
| Glycine | 4.20 |
| L-serine | 1.77 |
| L-tyrosine ethyl ester·HCl | 4.10 |
| L-tryptophan | 0.75 |
| L-glutamine | 9.07 |

Taste-panel tests are conducted on this amino acid solution, and these results are reported below for comparison with the amino acid solution formulated in Example IV.

EXAMPLE IV

A composition is prepared from the following amounts of recrystallized amino acids in the identical manner to that described in Example III:

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine·HCl·H₂O | 1.58 |
| L-methionine | 1.75 |
| L-alanine | 2.58 |
| L-aspartic acid | 5.50 |
| L-threonine | 2.42 |
| L-proline | 3.42 |
| Glycine | 4.20 |
| L-serine | 1.77 |
| L-tyrosine ethyl ester·HCl | 4.10 |
| L-tryptophan | 0.75 |
| L-glutamine | 9.07 |
| L-cysteine ethyl ester·HCl | 0.92 |

Taste-panel tests show that the amino acid solution formulated as set forth immediately above has a very disagreeable and unpalatable flavor when compared with the amino acid solution formulated in Example III. Both solutions have a pH between about 4 and 5. The only difference between the two compositions is the presence of L-cysteine ethyl ester·HCl in an amount that is equivalent to about 0.16 gram of sulfhydryl groups in the one liter of aqueous solution.

EXAMPLE V

A composition containing the essential and non-essential recrystallized amino acids set forth below and 585 g. of glucose is formulated by dissolution in water.

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine·HCl·H₂O | 1.58 |
| L-methionine | 1.75 |
| L-alanine | 2.58 |
| L-aspartic acid | 5.50 |
| L-threonine | 2.42 |
| L-proline | 3.42 |
| Glycine | 4.20 |
| L-serine | 1.77 |
| L-tyrosine ethyl ester·HCl | 4.10 |
| L-tryptophan | 0.75 |
| L-glutamine | 9.07 |

The method of addition of the amino acids and glucose of this composition is identical to that described in Example I. At the final step, distilled or deionized water is added to bring the volume to 1.00 liter.

Taste-panel testing of this composition is conducted in conjunction with taste-testing of the product formulated in Example VI and the results are reported hereinafter.

EXAMPLE VI

| | G. |
|---|---|
| L-lysine·HCl | 3.58 |
| L-leucine | 3.83 |
| L-isoleucine | 2.42 |
| L-valine | 2.67 |
| L-phenylalanine | 2.75 |
| L-arginine·HCl | 5.70 |
| L-histidine·HCl·H₂O | 1.58 |
| L-methionine | 1.75 |
| L-alanine | 2.58 |
| L-aspartic acid | 5.50 |
| L-threonine | 2.42 |
| L-proline | 3.42 |
| Glycine | 4.20 |
| L-serine | 1.77 |
| L-tyrosine ethyl ester·HCl | 4.10 |
| L-tryptophan | 0.75 |
| Sodium-L-glutamate | 2.04 |
| L-glutamine | 7.26 |

The formulation of essential and non-essential recrystallized amino acids set forth above plus 585 g. of glucose is prepared in a manner identical to that in Example V.

Taste-panel tests on the compositions prepared in Examples V and VI show that the taste of the composition in Example VI is extremely unpleasant and unpalatable for human consumption, contrasted with the pleasant taste of the composition of Example V. The composition prepared in Example VI differs from the composition prepared in Example V only in that it contains 2.04 grams of sodium-L-glutamate in the liter of aqueous solution, in lieu of an equimolar amount of L-glutamine. Further taste-panel tests show that the unpleasant taste is avoided if the glutamic acid content is limited to a maximum of 1.43 grams per liter of aqueous solution, which is equivalent to a maximum sodium-L-glutamate content of about 1.64 grams per liter.

EXAMPLE VII

The complete diet formulation of Table IV is prepared in a manner identical to that given under Example I, except that before final dilution, the fat, emulsifier, and fat-soluble vitamins are incorporated using suitable emulsifying apparatus. After emulsification, the total volume is brought to 2.5 liters with distilled or deionized water. The pH of the solution is about 3.7.

The dietary solution so prepared is evaluated by a taste-panel and compared with the dietary solution prepared in Example VIII.

EXAMPLE VIII

To a 100 milliliter portion of the dietary composition prepared in Example VII, there is added 6 milligrams of methyl mercatpan (equivalent to 60 mg. per liter).

The diet composition prepared in Examples VII and VIII are compared in taste-panel testing. It is found that, whereas the dietary composition made in Example VII is highly palatable for human consumption, the dietary composition made in Example VIII containing the methyl mercaptan has a "rotten cabbage" flavor which is highly objectionable to the human taste. Evaluations of subsequent formulations of the identical base diet containing varying amounts of methyl mercaptan show that the off-taste contributed by methyl mercaptan is avoided if the methyl mercaptan content of the diet solution is limited to a maximum of 15 mg. per liter of aqueous solution.

If impure methionine is employed in the preparation of the chemically defined nutrient compositions for human consumption, and/or if a process for the preparation of these nutrient compositions is employed which causes a degradation of the methionine component or other sulfur-containing component or components of the nutrient composition, then the total mercaptan content of the nutrient composition may easily exceed the tolerable concentration. Exceeding the limit for mercaptan content in the nutrient composition is avoided by employing freshly recrystallized methionine and by employing a formulation process that does not lead to excessive thermal degradation of the sulfur-containing amino acids.

Although the diet has generally been described as being in the form of an aqueous solution or an emulsion, the diet can be provided in dry form or in the form of a gel. For example, the diet formulation might be made with the components in solution and then suitably dried, as by spray-drying or freeze-drying, to produce a dry product which is very easily dissolved in water. Preferably the dry product should have a moisture level of less than about 5 percent. It is believed that stable complexes are formed in such a drying process that allow rapid re-dissolution and the accompanying re-forming of emulsions.

Because it is contemplated that such a dry product would not be consumed in dry form, but would instead be dissolved in water, the considerations previously indicated with regard to component levels to achieve palatability similarly apply. However, it is believed possible to provide some guidelines to the contents of such a dry product, using the consideration that it should be soluble as an aggregate in water and that it should contain a reasonable balance of its components for human nutrition. Inasmuch as the impurity methyl mercaptan is generally associated with the essential amino acids, and proceeding on the premise that a practical aqueous diet for the primary source of all nutrition should contain at least about 3 grams of essential amino acids per liter, the mercaptan present should be limited so that the level will be below about 15 mg. per liter after the intended final dilution to an aqueous solution having a pH between about 3 and about 4. Likewise, because the calorie level is provided mainly by the carbohydrate, the carbohydrate is provided in an amount at least about twice the weight of the essential amino acids, and more generally it will be provided in an amount of about ten to thirty times the weight of the amino acid in a product that is designed to serve as a complete dietary composition. Preferably, it is provided in an amount of at least about 20 times the weight of the essential amino acids, plus or minus about 5 percent. Preferably, the carbohydrate is selected from the group consisting of glucose, maltose, starches, dextrins and mixtures thereof and is present in an amount of 222 grams per liter of solution, plus or minus about 5 percent, and most preferably, the major portion of the carbohydrate is glucose.

The balance of the amino acids in a nutritionally balanced product can also be based upon one of the amino acids, because they are interrelated to one another. The relative weight percentages are conveniently based upon valine. As previously indicated with respect to methionine, some of the essential amino acid requirements can be replaced by non-essential amino acids. For example, substitution of a portion of the required amount of phenylalanine may be made with tyrosine, in which instance the relative weight percentages given might deviate somewhat between these two; however, the total of the two should be equimolar to that of the total tyrosine plus phenylalanine. The preferred amounts of the essential amino acids in such a dietary composition for human consumption based upon weight of valine, plus or minus about 5 percent are as follows: arginine, 177 percent; isoleucine, 91 percent; lysine, 103 percent; phenylalanine, 103 percent; histidine, 44 percent; leucine, 143 percent; methionine, 93 percent; threonine, 91 percent; and tryptophan, 28 percent. A liter solution of such a dietary composition should contain at least about the following amounts of the essential amino acids: arginine 0.61 g., histoidine 0.17 g., isoleucine 0.26 g., leucine 0.41 g., lysine 0.38 g., methionine 0.26 g., phenylalanine 0.29 g., threonine 0.26 g., tryptophan 0.08 g., and valine 0.28 g. Preferably, such a dietary composition would include the essential amino acids in the following amounts per liter, plus or minus about 5 percent: arginine 2.16 g., histodine 0.60 g., isoleucine 0.92 g., leucine 1.45 g., lysine 1.36 g., methionine 0.94 g., phenylalanine 1.04 g., threonine 0.92 g., tryptophan 0.28 g., and valine 1.01 g.

A similar preferred relationship for the non-essential amino acids has also been determined. Based upon weight of valine, the non-essential amino acids are provided in the following amounts, plus or minus about 5 percent: alanine, 97 percent; aspartic acid, 206 percent; glycine, 157 percent; glutamine, 340 percent; proline, 129 percent; serine, 66 percent; and tyrosine, 113 percent. Generally, a dietary composition would contain the following non-essential amino acids in the indicated amounts per liter of solution: alanine 0.98 g., aspartic acid 2.08 g., glycine 1.59 g., glutamine 3.44 g., proline 1.31 g., serine 0.67 g. and tyrosine 1.55 g.

One additional advantage of the diet formulations shown in Tables I–IV is that they are also freeze-stable, i.e., they will return to stable solution or emulsion form upon thawing. A gel which is semisolid and can be eaten by a spoon can be easily formed by adding a sufficient quantity of an edible gelatinizing agent to the emulsion or to the solution. Inasmuch as such a gel remains also a solution the foregoing criteria with regard to palatability likewise apply.

By the present invention, it is possible to produce nutritionally adequate chemical nutrient compositions, composed entirely of predetermined mixtures of pure amino acids, glucose, fatty acids, crystalline vitamins, and salts, which are palatable to the human taste, and which, by virtue of the relatively simple nature of the nutrient components, are able to by-pass all digestive functions. Because essentially all of the amino acids employed are in the L-isomer form, they are easily utilized by the body tissues. Moreover, it is possible to prepare such a liquid composition in highly concentrated form, as a 75 percent solution in water, so that a volume of one cubic foot will provide a man with all of his daily nutrient requirements for a period of nearly a month. It is also possible, by the present invention, to vary these chemical nutrient compositions to produce dietary compositions, palatable to the human taste, to meet special nutritional requirements. For such special requirements, it is only necessary to increase or decrease the amounts of one or more components of the composition, or to eliminate one or more such components, or to add one or more of other desired components. Therefore, a highly flexible dietary situation is provided which can accommodate special needs. It is believed that the invariably highly objectionable taste of previous amino acid-based diets was classically erroneously attributed to the amino acids themselves, whereas it has now been found that this is not the case and that palatable compositions can be formulated.

Modifications as would be obvious to one having the ordinary skill of the art may be made without departing from the principles and spirit of the invention.

Various of the features of the invention are set forth in the following claims.

I claim:

1. A palatable food composition for human consumption comprising all the essential amino acids in aqueous solution, said solution containing said essential amino acids in an amount of at least about 3 grams per liter, said solution containing at least about 0.26 gram per liter of methionine and containing methyl mercaptan in an amount not greater than about 15 mg. per liter, said solution containing a dissolved carbohydrate selected from the group consisting of monosaccharides, disaccharides, starches, dextrins and mixtures thereof in an amount of at least about 100 grams per liter, and said solution also including nutritionally significant amounts of the following ions: sodium, magnesium, potassium, iron, calcium, chloride and phosphate.

2. A food composition in accordance with claim 1 wherein the pH of said aqueous solution is between about 3 and about 4.

3. A food composition in accordance with claim 1 wherein the pH of said aqueous solution is in the range between about 3.4 and about 5.7.

4. A food composition in accordance with claim 1 wherein nonessential amino acids are present in an amount of at least about 3 grams per liter, said solution containing sulfhydryl groups in an amount not greater than about 0.05 gram per liter and said solution containing glutamic acid in an amount not greater than about 1.43 grams per liter.

5. A food composition in accordance with claim 4 wherein the pH of said aqueous solution is in the range between about 3.4 and about 5.7.

6. A food composition in accordance with claim 1 wherein said essential amino acids are present in at least about the following amounts per liter: arginine 0.61 g., histidine 0.17 g., isoleucine 0.26 g., leucine 0.41 g., lysine 0.38 g., phenylalanine 0.20 g., threonine 0.26 g., tryptophan 0.08 g., and valine 0.28 g.

7. A food composition in accordance with claim 1 wherein said ions are present in at least the following amount in concentrations of grams per liter: sodium 57 mg., magnesium 28.5 mg., potassium 285 mg., iron 2.85 mg., calcium 140 mg., chloride 0.2 g., and phosphorus 140 mg.

8. A food composition in accordance with claim 1 wherein said solution contains glucose as at least the major portion of said dissolved carbohydrate.

9. A food composition in accordance with claim 6 which has a caloric value of at least about one-half calorie per milliliter.

10. A food composition in accodance with claim 9 wherein said aqueous solution includes said amino acids in the following amounts per liter, plus or minus about 5 percent: arginine 2.16 g., histidine 0.60 g., isoleucine 0.92 g., leucine 1.45 g., lysine 1.36 g., methionine 0.94 g., phenylalanine 1.04 g., threonine 0.92 g., tryptophan 0.28 g., and valine 1.01 g.

11. A food composition in accordance with claim 10 wherein said aqueous solution includes non-essential amino acids in the following amounts per liter, plus or minus about 5 percent: alanine 0.98 g., aspartic acid 2.08 g., glycine 1.50 g., glutamine 3.44 g., proline 1.31 g., serine 0.67 g. and tyrosine 1.55 g.

12. A good composition in accordance with claim 10 wherein said aqueous solution contains a carbohydrate selected from the group consisting of glucose, maltose, starches, dextrins and mixtures thereof in an amount of about 222 grams per liter, plus or minus about 5 percent.

13. A food composition in accordance with claim 10 wherein said aqueous solution includes the following compounds in the amounts stated, plus or minus about 5 percent, per liter: hydrated calcium chloride 1.63 g., hydrated cupric acetate 3.45 mg., hydrated ferrous ammonium sulfate 3.9 mg., magnesium oxide 143 mg., hydrated manganous acetate 6.94 mg., potassium chloride 1.29 g., potassium hydroxide 0.71 g., potassium iodide 0.1 mg., sodium chloride 0.67 g., hydrated sodium glycerophosphate 4.50 g., sodium hydroxide 0.63 g., zinc chloride 0.47 mg., acetic acid 3.31 mg., glucono-delta-lactone 3.50 g.

14. A food composition in accordance with claim 10 wherein said aqueous solution includes the following water-soluble vitamins in the stated amounts, plus or minus about 5 percent, per liter: potassium salt of p-aminobenzoic acid 197 mg., ascorbic acid 38.9 mg., d-biotin 0.11 mg., d-calcium pantothenate 5.5 mg., choline chloride 46.8 mg., folic acid 0.06 mg., inositol 64.8 mg., niacinamide 7.4 mg., pyridoxine·HCl 1.1 mg., sodium salt of riboflavin phosphate 0.91 mg., thiamine·HCl 0.7 mg., and cyanocobalamin 2.8 mcg.

15. A food composition in accordance with claim 10 which includes, in the form of an emulsion with said aqueous solution, the following substances in the stated amounts, plus or minus about 5 percent, per liter: purified safflower oil or ethyl linoleate 0.74 g. and polyoxyethylene sorbitan monooleate 37 mg.

16. A food composition in accordance with claim 15 wherein said emulsion contains the following fat-soluble vitamins in the stated amounts, plus or minus about 5 percent, per liter: Vitamin A acetate 0.96 mg., Vitamin D 5.5 mcg., alpha-tocopherol acetate 11.1 mg., and menadione 0.07 mg.

17. A substantially dry palatable food composition for human consumption comprising all the essential amino acids, a water-soluble carbohydrate selected from the group consisting of mono-saccharides, disaccharides, starches, dextrins and mixtures thereof, in an amount at least about twice the weight of said essential amino acids, and water-soluble salts including nutritionally significant amounts of the following anions and cations: sodium, magnesium, potassium, iron, calcium, chloride and phosphate, said amino acids, water-soluble carbohydrate and water-soluble salts being soluble in water to provide a solution, a liter of which solution containing at least about 3 grams of said essential amino acids, contains including at least about 0.26 gram of methionine which contains methyl mercaptan in an amount not greater than about 15 mg.

18. A food composition in accordance with claim 17 which contains a sufficient amount of an organic acid so that said aqueous solution would have a pH between about 3 and 4.

19. A food composition in accordance with claim 17 which contains a sufficient amount of an organic acid so that said aqueous solution would have a pH in the range between about 3.4 and about 5.7.

20. A food composition in accordance with claim 17 which also includes non-essential amino acids, said non-essential amino acids being present in a amount at least about equal in weight to said essential amino acids, said non-essential amino acids being limited in the amounts of cystine, cysteine and glutamic acid contained so that upon dissolution said liter of solution contains sulfhydryl groups in an amount not greater than about 0.05 gram and contains glutamic acid in an amount not greater than about 1.43 grams.

21. A food composition in accordance with claim 20 which contains a sufficient amount of an organic acid so that said aqueous solution would have a pH in the range between about 3.4 and about 5.7.

22. A food composition in accordance with claim 17 wherein said essential amino acids are so balanced that said at least three grams of said essential amino acids in said liter of solution are present in at least about the following amounts: arginine 0.6 g., histidine 0.17 g., isoleucine 0.26 g., leucine 0.41 g., lysine 0.38 g., methionine 0.26 g., phenylalanine 0.29 g., threonine 0.26 g., tryptophan 0.08 g., and valine 0.28 g.

23. A food composition in accordance with claim 17 wherein said ions are present in sufficient amounts to provide at least the following amounts in said liter of solution: sodium 57 mg., magnesium 28.5 mg., potassium 285 mg., iron 28.5 mg., calcium 140 mg. and phosphate 140 mg.

24. A food composition in accordance with claim 20 wherein said amino acids are essentially all in the L-isomer form.

25. A food composition in accordance with claim 23 wherein said amino acids are provided in the following weight relationships, plus or minus about 5 percent, to one another, based upon weight of valine: arginine, 177 percent; histidine, 44 percent; isoleucine, 91 percent; leucine, 143 percent; lysine, 103 percent; methionine, 93 percent; phenylalanine, 103 percent; threonine, 91 percent; and tryptophan, 28 percent.

26. A food composition in accordance with claim 25 wherein said non-essential amino acids are provided in the following amounts, plus or minus about 5 percent, based upon weight of valine: alanine, 97 percent; aspartic acid, 206 percent; glycine, 157 percent; glutamine, 340 percent; proline, 129 percent; serine, 66 percent; and tyrosine, 113 percent.

27. A food composition in accordance with claim 25 wherein said carbohydrate is selected from the group consisting of glucose, maltose, starches, dextrins and mixtures thereof and is provided in an amount of about 20 times the weight of said essential amino acids, plus or minus about 5 percent.

28. A food composition in accordance with claim 25 which includes the following compounds in the amounts stated, plus or minus about 5 percent, per 10 grams of essential amino acids: hydrated calcium chloride 1.53 g., hydrated cupric acetate 3.19 mg., hydrated ferrous ammonium sulfate 36 mg., magnesium oxide 134 mg., hydrated manganous acetate 6.5 mg., potassium chloride 1.21 g., potassium hydroxide 0.66 g., potassium iodide 0.10 mg., sodium chloride 0.63 g., hydrated sodium glycerophosphate 4.25 g., sodium hydroxide 0.59 g., zinc chloride 0.44 mg., acetic acid 3.1 mg., glucono-delta-lactone 3.29 g.

29. A food composition in accordance with claim 25 which includes the following water-soluble vitamins in the stated amounts, plus or minus about 5 percent, per 10 grams of said essential amino acids thereof: potassium salt of p-aminobenzoic acid 185 mg., ascorbic acid 36.4 mg., d-biotin 0.1 mg., d-calcium pantothenate 5.2 mg., choline chloride 44 mg., folic acid 0.05 mg., inositol 60.5 mg., niacinamide 6.9 mg., pyridoxine·HCl 1.04 mg., sodium salt of riboflavin phosphate 0.85 mg., thiamine·HCl 0.63 mg., and cyanocobalamin 2.6 mcg.

30. A food composition in accordance with claim 25 which includes, in a condition wherein upon dissolution an emulsion is formed with said aqueous solution, the following substances in the stated amounts, plus or minus about 5 percent, per 10 grams of essential amino acids thereof: purified safflower oil or ethyl linoleate 0.69 g. and polyoxyethylene sorbitan monoleate 35 mg.

31. A food composition in accordance with claim 30 which contains the following fat-soluble vitamins in the stated amounts, plus or minus about 5 percent, per 10 grams of essential amino acids: Vitamin A acetate 0.9 mg., Vitamin D 5.2 mcg., alpha-tocopherol acetate 10.4 mg., and menadione 0.06 mg.

References Cited

UNITED STATES PATENTS 3,394,016   7/1968   Bidmead _____ 99—140

OTHER REFERENCES

Greenstein et al.: Archives of Biochemistry and Biophysics vol. 72, 396–416 (1957).

Winitz et al., Nature, vol. 205, No. 4973, pp. 741–743 (Feb. 20, 1965).

Greenstein et al.: Chemistry of the Amino Acids, vol. 1, p. 151 (1961).

RAYMOND N. JONES, Primary Examiner

R. B. ANDEWELT, Assistant Examiner

U.S. Cl. X.R.

99—11, 14, 28; 424—319

UNITED STATES PATENT OFFICE
CERTIFICATE OF CORRECTION

Patent No. 3,697,287　　　　　　　　Dated October 10, 1972

Inventor(s) Milton Winitz

It is certified that error appears in the above-identified patent and that said Letters Patent are hereby corrected as shown below:

Col. 3, line 13, change "or" to --of--.

Col. 5, line 63, change "concentrations" to --concentration--,

Col. 5, line 71, insert "15" before "milligrams".

Col. 8, between lines 53 and 54 insert "Thiamine·HCl mg 1.53"

Col. 19, line 61, change "1.50" to --1.59--.

Col. 20, line 40, delete ", contains"

Col. 22, line 3, delete "thereof",

Col. 22, line 15, delete "thereof".

Signed and sealed this 19th day of March 1974.

(SEAL)
Attest:

EDWARD M. FLETCHER, JR.　　　　C. MARSHALL DANN
Attesting Officer　　　　　　　　Commissioner of Patents